United States Patent [19]
Brolund et al.

[11] 4,129,460
[45] Dec. 12, 1978

[54] METHOD FOR COPING I-BEAMS

[75] Inventors: Theodore F. Brolund, Rockford; William B. Scott, Rochelle, both of Ill.

[73] Assignee: W. A. Whitney Corp., Rockford, Ill.

[21] Appl. No.: 848,221

[22] Filed: Nov. 3, 1977

[51] Int. Cl.² ............................................. B23K 7/00
[52] U.S. Cl. ................................................... 148/9 R
[58] Field of Search ...................... 148/9, 9.6; 266/48

[56] References Cited

U.S. PATENT DOCUMENTS

| | | | |
|---|---|---|---|
| 1,901,428 | 3/1933 | Anderson | 148/9 R |
| 2,187,731 | 1/1940 | Davis | 148/9 R |
| 2,599,324 | 6/1952 | Forkey | 148/9 R |
| 3,908,973 | 9/1975 | Martin | 148/9 R |

*Primary Examiner*—W. Stallard
*Attorney, Agent, or Firm*—Leydig, Voit, Osann, Mayer & Holt, Ltd.

[57] ABSTRACT

Part of the upper flange at the end portion of an I-beam is removed therefrom by cutting through the flange with a plasma-arc torch, the torch also forming a vertical cut through the lower flange of the beam. Thereafter, a shearing punch shears through the web of the beam to remove the lower flange from the end portion of the beam. Because a portion of the upper flange is removed from the beam prior to the shearing operation, the punch does not engage any substantial part of the upper flange and thus the punch may effect shearing of the web along a line located in close proximity to the junction of the web and the flanges.

6 Claims, 5 Drawing Figures

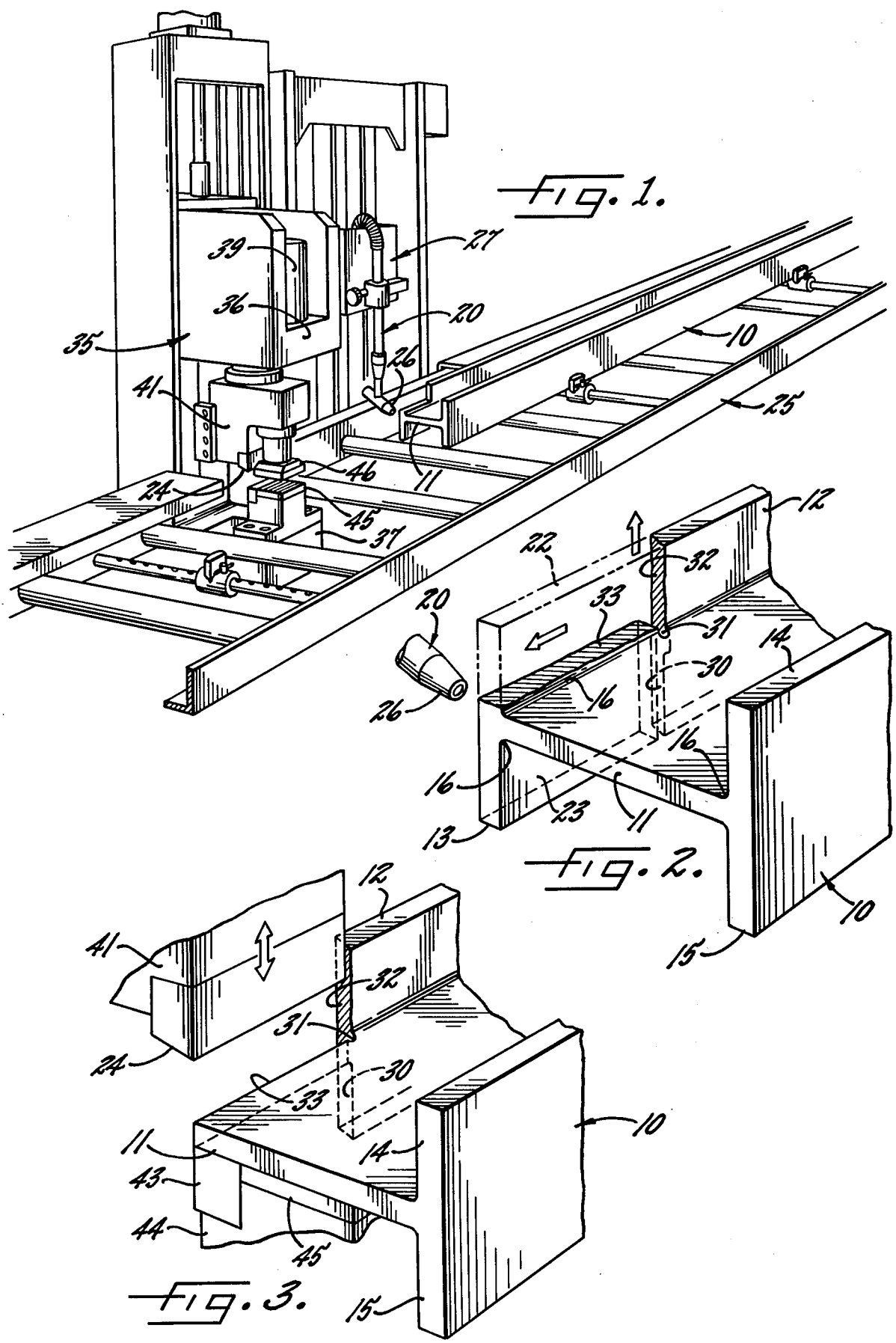

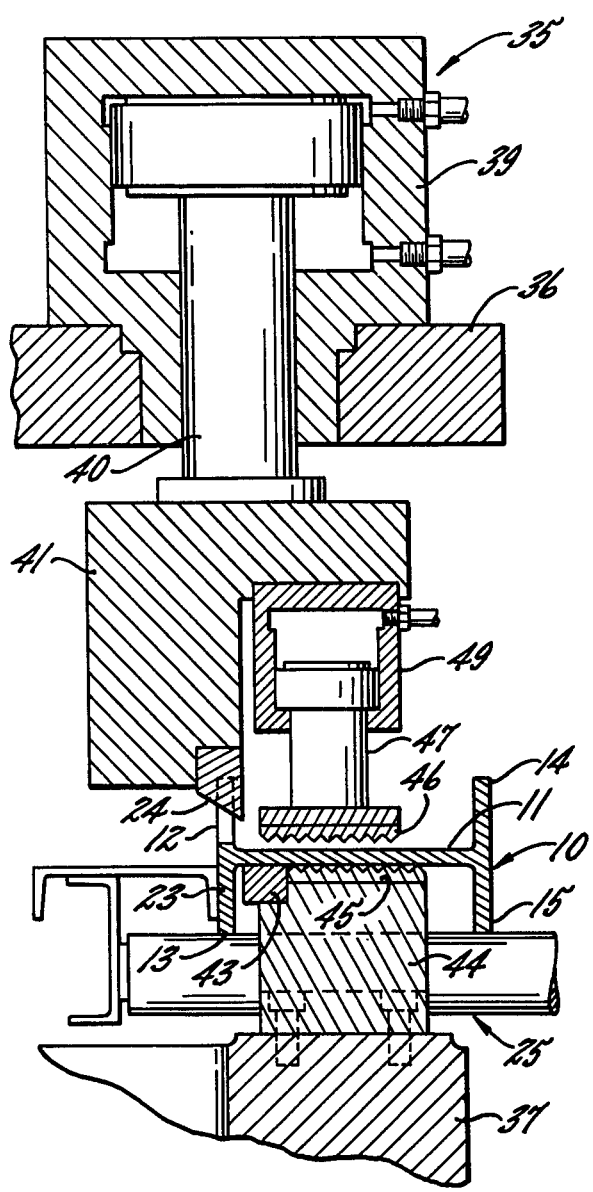
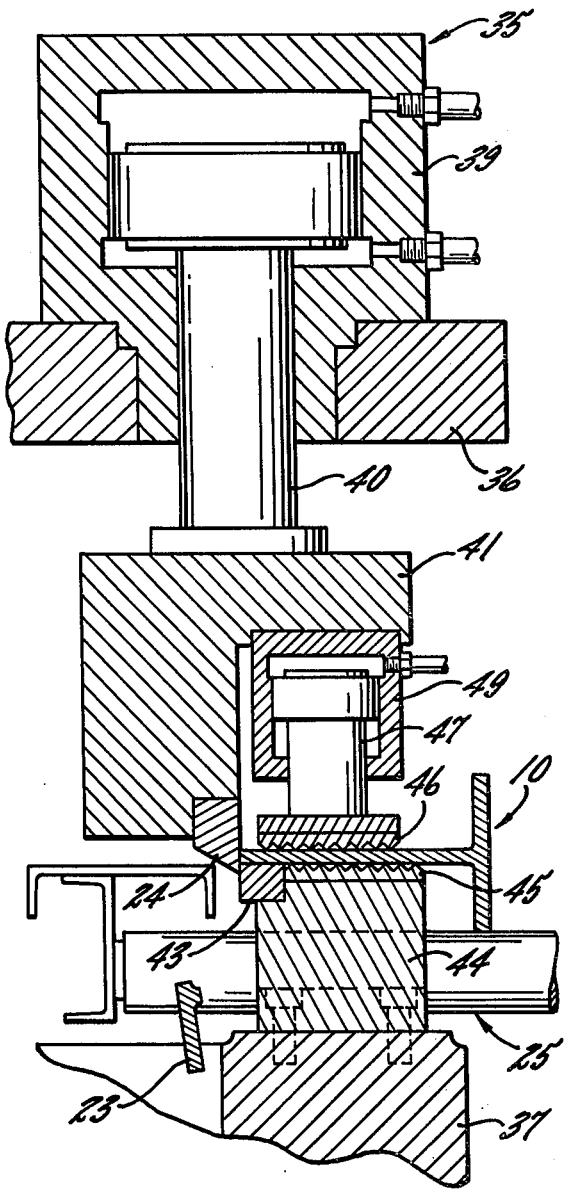
Fig. 4.
Fig. 5.

METHOD FOR COPING I-BEAMS

BACKGROUND OF THE INVENTION

This invention relates to a method for coping the end portion of a metal I-beam having a longitudinally extending web and having upper and lower flanges projecting vertically from the web.

Beam coping is an operation in which the upper and lower flanges adjacent one end portion of the beam are removed therefrom along one margin of the web to facilitate connection of the beam to another beam, a column or a similar structural member. In many instances, it is necessary to separate the flanges from the web along a line located in very close proximity to the junction of the flanges and the web. In the past, beam coping most conventionally has been performed manually by an operator who cuts the flanges and the web with an oxygen flame cutting torch.

SUMMARY OF THE INVENTION

The general aim of the present invention is to provide a new and improved beam coping method which may be performed quicker and easier than prior methods and which, at the same time, enables more precise coping of the flanges and web.

A more detailed object is to achieve the foregoing by coping the beam in a two-step operation. The first step involves the use of an automated metal melting tool, such as a plasma arc torch, which serves to remove a substantial part of one of the flanges from the beam and to form a cut in the other flange. The second step involves the use of a shearing punch which removes the other flange from the beam by shearing through the web adjacent the junction of the web and the flanges. Because part of the first flange is removed prior to the shearing operation the shearing punch engages only a short portion of the upper flange and sufficient clearance is provided to enable the punch to effect shearing of the web along a line which is located very close to the junction.

The invention also resides in the ability to clamp the beam in a rigid position during the shearing operation to insure that the shearing is effected along a desired line which is close to the junction of the flanges and the web.

These and other objects and advantages of the invention will become more apparent from the following detailed description when taken in conjunction with the accompanying drawings.

BRIEF DESCRIPTION OF THE DRAWINGS

FIG. 1 is a fragmentary perspective view showing exemplary equipment for performing the new and improved beam coping method of the present invention.

FIG. 2 is a fragmentary perspective view showing the first step of the coping operation.

FIG. 3 is a view similar to FIG. 2 but shows the second steps of the coping operation.

FIG. 4 is a fragmentary vertical sectional view taken through an exemplary press for performing the shearing operation.

FIG. 5 is a view similar to FIG. 4 but shows certain parts of the press in moved positions.

DETAILED DESCRIPTION OF THE PREFERRED EMBODIMENT

The present invention is concerned with coping the end portion of a metal I-beam 10 of the type having a longitudinally extending web 11 disposed in a generally horizontal plane and having longitudinally extending upper and lower flanges 12 and 13 (FIG. 2) which project upwardly and downwardly, respectively, from one of the side margins of the web. An additional pair of upper and lower flanges 14 and 15 projects vertically from the opposite side margins of the web. The junctions of the flanges with the web are defined by radiused fillets as indicated at 16.

To permit the beam 10 to be connected, for example, at right angles to another beam, those portions of the flanges 12 to 15 at one end portion of the beam often are removed from the beam, the removal of the flanges customarily being referred to as a coping operation. In the beam illustrated in FIGS. 3 and 5, the end portions of the flanges 12 and 13 are shown as having been removed and it should be understood that the corresponding end portions of the flanges 14 and 15 may be removed in a similar manner. Thus, the coped beam is left with a portion of the web 11 projecting longitudinally from the ends of the flanges.

The present invention contemplates removal of the end portions of the flanges 12 and 13 (or the flanges 14 and 15) by a unique and comparatively fast and simple two-step method which enables the flange end portions to be separated from the web 11 along a nearly perfect straight line which is located in close proximity to the junction of the flanges and the web. In brief, the first step of the method involves forming a T-shaped cut with a metal melting tool 20 (FIGS. 1 and 2) to separate the end portions 22 and 23 of the flanges 12 and 13 from the remaining portions of the flanges and to separate one of the end portions (herein, the end portion 22 of the upper flange) from the web along a line spaced vertically from but located very close to the web, the end portion 22 falling away from the beam 10 when the cut is completed. Thereafter, a shearing punch 24 moves vertically through the space formerly occupied by the removed flange portion 22 and shears through the web to remove the other flange portion 23 from the end of the beam. Because the upper flange portion 22 is removed from the beam prior to the shearing operation, the remaining part of the upper flange is of short height and possesses increased column strength and thus such remaining part will not buckle to any significant degree when engaged by the punch. Accordingly, the punch may engage the flange immediately above the web, may be positioned closely adjacent the side margin of the web and may effect shearing of the web along a well-defined line which is in close proximity to the junction of the web and the flanges.

More specifically, coping of the beam 10 is effected while the beam is disposed on a roller conveyor 25 having reversible power-driven rollers which may be controlled so as to advance the beam in one direction or the other and to stop the beam at selected locations along the conveyor. The beam illustrated in FIG. 1 is adapted to be moved from right-to-left and, as shown, the coping operation is being performed on the leading or forward end of the beam.

The metal melting tool 20 preferably is in the form of a plasma-arc torch of the type sold, for example, by Thermal Dynamics Corporation of West Lebanon, N.H. Basically, such a torch includes a tip 26 (FIGS. 1 and 2) defining a small orifice through which an ionized column of gas and an electric arc are forced. The plasma stream and the electric arc (hereinafter call the plasma-arc) are discharged from the orifice at high velocity and produce extremely high temperatures which effect virtually instantaneous melting of metal.

In the present instance, the torch 20 is supported on a carriage mechanism 27 (FIG. 1) which may be moved to shift the torch along vertical and longitudinal coordinates with respect to the beam 10. The torch is positioned with its tip 26 facing the outer sides of the flanges 12 and 13 and thus, when the torch is turned on, the plasma-arc energy is directed toward the outer side of the flanges to melt away the metal thereof and to form a cut having a width substantially equal to the diameter of the orifice in the tip 26.

In performing the first step of the coping operation, the beam 10 is stopped with its leading end positioned a short predetermined distance forwardly of the tip 26 of the torch 20, the tip being positioned just below the lower edge of the lower flange 13. The torch then is turned on and is shifted upwardly and automatically by the carriage mechanism 27 to cause the tip 26 to move in a vertical path along the outer sides of the flanges 12 and 13 until the tip has reached an elevation above the upper edge of the upper flange. During such movement, the plasma-arc forms a vertical cut 30 (FIG. 2) through the lower flange 13, a vertical cut 31 a short distance into the web 11 and a vertical cut 32 in the upper flange 12. The three vertical cuts form the cross bar of the T defined by the T-shaped cut referred to above. While such cuts could be made by moving the torch downwardly from the upper edge of the upper flange 12, it is preferred to move the torch in an upward direction in order to prevent the molten metal from running down the flanges and creating an interfering buildup ahead of the torch. Also, the tip 26 can be positioned at various angles relative to the vertical path so as to cause the ends of the flanges 12 and 13 to be left with either a right angled cut or a beveled cut, the latter cut defining a weld groove for facilitating a welded connection between the beam 10 and another beam.

After the tip 26 of the torch 20 has been shifted upwardly beyond the upper edge of the upper flange 12, the torch is turned off and is moved downwardly along the same vertical path until the tip is positioned approximately one-fourth inch above the upper surface of the web 11. Thereafter, the torch is moved forwardly along a longitudinal path to cause the plasma-arc to form a longitudinal cut 33 (FIG. 2) through the upper flange 12 just above the web, the longitudinal cut extending from the vertical cut 32 to the forward end of the beam and forming the stem of the T defined by the T-shaped cut. As soon as the longitudinal cut is completed, the flange end portion 22 which is bordered by the longitudinal cut and the vertical cut 32 falls away from the end of the beam (see FIGS. 2 and 3).

The beam 10 then is advanced forwardly to locate the web 11 in a predetermined position beneath the shearing punch 24. As shown in FIG. 1, the punch is associated with a shearing press 35 having a generally C-shaped frame which is defined in part by an upper arm 36 (FIG. 4) located above the conveyor 25 and by a lower bolster 37 located beneath the conveyor. An hydraulic actuator 39 is mounted on the arm 36 and includes a vertically reciprocable ram 40 whose lower end is connected to a block 41 which carries the punch 24. The latter is adapted to coact with a shearing die 43 located beneath the web 11 of the beam 10 and supported by a die holder 44 which is secured to the bolster 37.

The press 35 is completed by a lower clamp 45 (FIG. 4) which is secured to the die holder 44 and which coacts with an upper clamp 46 to securely grip the web 11 of the beam 10 during the shearing operation. The upper clamp is carried on the lower end of a vertically reciprocable rod 47 which is slidably mounted in a cylinder 49 secured to the block 41. The upper end of the cylinder normally is pressurized by pressure fluid which may escape from the cylinder under the control of a relief valve (not shown).

During the time the beam 10 is being advanced toward the press 35, the entire press is disposed in an extended position in which the die 43 is spaced inwardly from the lower flange 13 so as to permit the flange to advance past the die. Also, the punch and the upper clamp 46 are retracted upwardly (see FIG. 4) to permit advancement of the beam.

After the beam 10 has been stopped with the leading end portion of the web 11 located above the die 43, the entire press 35 is retracted outwardly by mechanism (not shown) in order to locate the cutting edge of the die within one-eighth inch of the inner side of the lower flange 13. With the die so positioned, its cutting edge usually is disposed in underlying engagement with the radiused fillet 16 which is located at the junction of the web 11 and the flange 13. The cutting edges of the die and the punch 24 are at least equal in length to the length of the longitudinal cut 33 and, when the beam is stopped at the press 35, the rear ends of the two cutting edges are located adjacent the vertical cuts 30, 31 and 32.

The shearing operation is effected by operating the actuator 39 to advance the punch 24 and the upper clamp 46 downwardly. The upper clamp engages and stops against the web 11 before the punch moves past the web and thus the upper clamp presses the beam securely against the lower clamp 45 to prevent the beam from shifting and to prevent the web from distorting when the punch effects shearing of the web (see FIG. 5). During continued downward movement of the punch 24, pressure fluid escapes from the cylinder 49 but keeps the upper clamp pressed securely against the web.

After the web 11 has been clamped, the punch 24 either engages the web directly or engages the short upper flange portion above the web thereby to effect shearing of the web. As a result, the lower flange end portion 23 and a small portion of the web fall away from the beam 10 (see FIG. 5). During the shearing operation, the body of the punch 24 moves downwardly through the space which formerly was occupied by the previously cut-away end portion 22 of the upper flange 12. Because the punch is free to occupy such space, the cutting edge of the punch may be positioned as close as one-eighth inch from the inner side of the flange 12. Also, the short flange part above the web does not buckle when engaged by the punch since the short flange part possesses high column strength. Accordingly, the shear which is effected by the punch and the die 43 is located along a virtually straight line which is very close to the junction of the web and the flanges. Thus, the shearing operation removes part of the web to provide clearance enabling the edge of the web to be welded to another beam but such clearance is kept comparatively small so as to permit a strong weld joint to be formed.

From the foregoing, it will be apparent that the present invention brings to the art a new and improved beam coping method in which the plasma-arc torch 20 forms a T-shaped cut in the flanges 12 and 13 to remove the flange end portion 22 and, if desired, to leave the flanges with ends which are beveled to facilitate welding of the beam to another beam. The shear effected by the punch 24 occurs along a virtually perfect straight line which may be located close to the junction of the flanges and the web 11 to enable a good weld joint to be made along the end portion of the web. Because the beam is held rigidly against shifting by the clamps 45 and 46 during the shearing, a precise shear may be effected even though the punch 24 and the die 43 act against the radiused fillets 16.

We claim:

1. A method of coping the end portion of a metal I-beam having a longitudinally extending web disposed in a generally horizontal plane and having longitudinally extending upper and lower flanges projecting upwardly and downwardly, respectively, from one margin of the web, said method comprising the steps of, moving a metal melting tool along a generally vertical path spaced longitudinally from one end of the beam and extending along the outer sides of said flanges between the lower edge of said lower flange and the upper edge of said upper flange, directing metal melting energy from said tool toward the outer sides of said flanges during such movement to form a vertical cut through said flanges, moving said tool longitudinally along a path located between said web and the upper edge of said upper flange and extending along the outer side of said upper flange between said vertical cut and said one end of said beam, directing metal melting energy from said tool toward the outer side of said upper flange during movement of said tool along the last-mentioned path to form a longitudinal cut through said upper flange and to permit removal from the beam of that portion of the upper flange located longitudinally from said vertical cut and above said longitudinal cut, and thereafter shearing downwardly through said one margin of said web along a line located inwardly of said flanges and extending from said vertical cut to said one end of said beam to remove from the beam those portions of the flanges and the web located outwardly of said line, longitudinally of said vertical cut and below said longitudinal cut.

2. A method as defined in claim 1 in which said vertical cut is effected by moving said tool vertically from the lower edge of said lower flange to the upper edge of said upper flange.

3. A method as defined in claim 2 in which said longitudinal cut is performed after said vertical cut and is effected by moving said tool from said vertical cut to said one end of said beam.

4. A method as defined in claim 1 in which said shearing is effected by moving a shearing tool downwardly within the space formerly occupied by that portion of the upper flange located longitudinally from said vertical cut and above said longitudinal cut.

5. A method as defined in claim 4 further including the step of clamping the upper and lower sides of said web at locations located inwardly of said line, said clamping being effected prior to said shearing.

6. A method of coping the end portion of a metal I-beam having a longitudinally extending web disposed in a generally horizontal plane and having upper and lower flanges projecting upwardly and downwardly, respectively, from one margin of the web, said method comprising the steps of, moving a metal melting tool along the outer sides of said flanges adjacent said one end portion of said beam and directing metal melting energy from said tool toward the outer side of said flanges during such movement, said tool being moved along such coordinates as to cause said energy to form a generally T-shaped cut through said flanges, the cross bar of the T extending generally vertically from the lower edge of the lower flange to the upper edge of the upper flange, the stem of the T being located between said web and one edge of one of said flanges and extending longitudinally from the cross bar of the T to one end of the beam, removing from said one end portion of said beam that portion of said one flange bordered by the stem and part of the cross bar of the T, and thereafter shearing vertically through said one margin of said web along a line located inwardly of said flanges and extending from the cross bar of the T to said one end of said beam, said shearing being effected by a shearing tool which, during such shearing, occupies space formerly occupied by said removed portion of said one flange.

* * * * *